C. F. HAYNES.
CARRIAGE LIFTING FRAME.

No. 177,638.  Patented May 23, 1876.

UNITED STATES PATENT OFFICE.

CHARLES F. HAYNES, OF SKOWHEGAN, MAINE.

IMPROVEMENT IN CARRIAGE-LIFTING FRAMES.

Specification forming part of Letters Patent No. 177,638, dated May 23, 1876; application filed December 13, 1875.

*To all whom it may concern:*

Be it known that I, CHARLES F. HAYNES, of the town of Skowhegan, in the county of Somerset and State of Maine, have invented a new and useful Machine for the Purpose of Lifting and Supporting Carriages, all as set forth in the following specification, reference being had to the accompanying drawings.

The object of my invention is to raise all manner of wheeled vehicles from the ground, for the purpose of oiling, washing, painting, varnishing, repairing, &c., by a folding frame, which, being placed beneath a carriage, raises it by being unfolded on the third principle of the lever, as follows: The ground being the fulcrum, the carriage the weight, and the revolving stop and rest G the points at which the power is applied by means of the strap H. By pulling the strap the legs—provided with brads for that purpose—become fixed upon the ground, and the upper parallel bars describe the arc of a circle, which brings the rests F F and G in contact with the rear and front axles, respectively. A continuation of this forward motion until the legs have slightly passed the vertical line raises the vehicle, as aforesaid.

Figure 1:
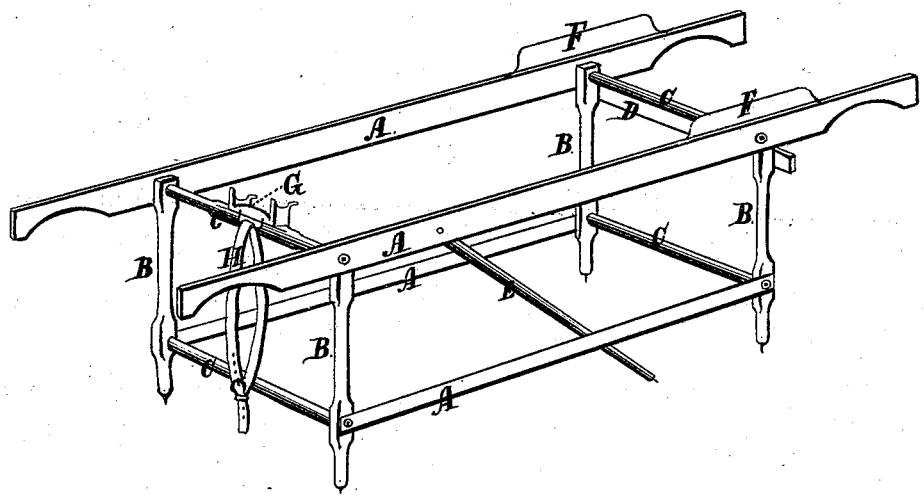

In Figure 1, A A A A represent parallel horizontal bars, the uppermost terminating in handles, and B B B B legs, connected with said bars by round tenons on the ends of the transverse bars C C C C, and secured by screws or pins; D, transverse stop; E, diagonal stop for greater security; F F, rests for rear axles; G, revolving stop and rest for forward axle, to which the strap H is attached, and by which the machine is unfolded.

The legs and diagonal stop are provided with brads to prevent sliding.

Figure 2:
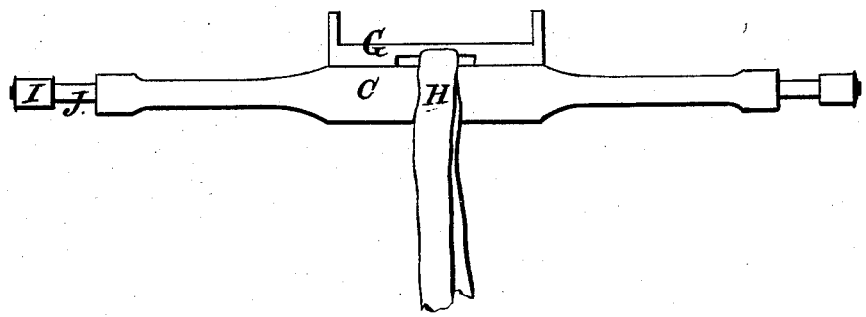

Fig. 2 is to show the square tenon I, which prevents the upper forward transverse bar from turning.

I claim as my invention—

The combination of the legs, cross and horizontal bars, by which eight movable joints are formed, with rests and stops, substantially as described, and for the purposes herein set forth.

CHARLES F. HAYNES.

Witnesses:
 CHAS. F. JONES,
 E. R. SEVENO.